United States Patent [19]
> Leshner et al.

[11] 4,232,643
[45] Nov. 11, 1980

[54] CHARGE FORMING SYSTEM FOR MAINTAINING OPERATION OF AN INTERNAL COMBUSTION ENGINE AT ITS LEAN LIMIT

[75] Inventors: Ervin Leshner; Michael D. Leshner, both of Cherry Hill, N.J.

[73] Assignee: Fuel Injection Development Corporation, Bellmawr, N.J.

[21] Appl. No.: 743,764

[22] Filed: Nov. 22, 1976

[51] Int. Cl.³ .................. F02B 3/00; F02M 17/18; F02B 33/00

[52] U.S. Cl. .................. 123/440; 123/486; 123/585

[58] Field of Search ......... 123/32 EA, 119 EC, 133, 123/122 E, 124 B, 124 R, 32 EE, 139 AW; 60/276, 133

[56] References Cited

U.S. PATENT DOCUMENTS

| | | | |
|---|---|---|---|
| 2,746,440 | 5/1956 | Eriksen | 123/133 |
| 3,142,967 | 8/1964 | Schweitzer | 123/117 R |
| 3,470,858 | 10/1969 | Mycroft | 123/139 AW |
| 3,789,816 | 2/1974 | Taplin | 123/32 EA |
| 3,827,237 | 8/1974 | Linder | 60/276 |
| 3,986,352 | 10/1976 | Casey | 60/276 |
| 4,099,493 | 7/1978 | Latsch et al. | 123/32 EA |
| 4,104,990 | 8/1978 | Frobenius | 123/32 EA |

*Primary Examiner*—Ronald B. Cox
*Attorney, Agent, or Firm*—Woodcock, Washburn, Kurtz, Mackiewicz & Norris

[57] ABSTRACT

A charge forming system is disclosed which monitors a parameter of engine combustion efficiency, such as power output, and derives a signal indicating the sense of power change. A fuel mixture control system responds to an indication of increasing power to continually and progressively lessen the fuel/air ratio to attain the leanest possible mixture consistent with maximum instantaneous engine power output. In a preferred embodiment liquid fuel is vaporized before delivery to the engine combustion chambers, and a variable orifice provided to enhance the flow characteristics of the vaporized fuel.

14 Claims, 5 Drawing Figures

CHARGE FORMING SYSTEM FOR MAINTAINING OPERATION OF AN INTERNAL COMBUSTION ENGINE AT ITS LEAN LIMIT

BACKGROUND OF THE INVENTION

The present invention relates to charge forming systems, and more particularly to a system which automatically and continuously seeks an optimum air/fuel mixture.

The provision of an instantaneously correct fuel/air mixture to an internal combustion engine over a full range of speeds and loads has for years occupied countless engineers, technicians and inventors. Accordingly, the charge forming apparatus have progressed over the years from crude mixing devices to complex, sophisticated carburetion and fuel injection systems. Nonetheless, it is recognized that to date no charge forming system has been implemented which will provide the ideal fuel/air mixture to an internal combustion engine over a complete operating range.

Of the various approaches to charge forming systems, two basic lines of attack may be discerned. With one approach, air inflow is controlled by a throttle or the like and fuel is caused to be entrained with the passing air, in response to the air flow characteristics. The metering of the mixing apparatus is such that a relatively constant, predictable mixture results over the anticipated air flow range. This is the basic rule of operation of the carburetor, which is of course the predominant charge forming mechanism used with internal combustion engines. The same thesis, however, has also been implemented in many forms of fuel injection apparatus.

The second approach referred to above may be referred to as a "programmed" approach inasmuch as the charge forming system is "programmed" or adjusted to respond to certain stimuli to effect a desired fuel/air ratio. The stimuli applied to such systems may include temperature, pressure, engine speed, and the like. Conventionally, such systems make use of not one but a plurality of stimuli in order to more accurately react to inferred engine operating conditions. Charge forming systems of this type thus react to given types of stimuli in a predetermined manner, effecting a fuel/air ratio which is assumed to be the "correct" one for the engine. In theory this approach should work well, assuming that a great number of preprogrammed responses are available to correspond to the almost limitless combinations of stimuli which occur over the full range of operation for most internal combustion engines, especially those used in vehicles.

In recent years the increased recognition of environmental degradation caused by internal combustion engine exhaust, along with the need for economical operation, has caused renewed interest in more efficient and sophisticated charge forming control systems. Generally, the approach taken in developing more responsive charge control systems has been to make use of the most modern and sophisticated technology, particularly in the field of electronics, to accommodate the functional complexities which are inherent in the "programmed" type of system. Accordingly, control systems which are in effect small analog or digital computers are created which can "tailor" a fuel/air ratio to a given operating condition, as evidenced by various stimuli. The stimuli or sensed parameters include exhaust gas temperature and composition, engine temperature, combustion pressure, inlet manifold and/or venturi vacuum, engine speed, along with many other operating parameters. However, inasmuch as these systems all provide a fixed, predetermined response to a given set of stimuli, they cannot be flexible enough to find the true optimum fuel/air ratio for all operating conditions, but rather provide mixture ratios which are only assumed to be correct.

Accordingly, it will be appreciated that it would be desirable to provide an improved charge forming system which consistently achieves the actual optimum fuel/air ratio for any given operating condition.

It is therefore an object of the present invention to provide an improved charge forming system for optimizing the mixture ingested by an internal combustion engine over a broad operating range.

It is another object of the present invention to provide an improved charge forming system which does not provide a predetermined or programmed mixture to an internal combustion engine.

Yet another object is to provide an improved fuel metering system for supplying vaporized fuel to an internal combustion engine.

It is a further object to provide a charge forming system for an internal combustion engine which effects a marked reduction in the output of pollutants by the engine.

SUMMARY OF THE INVENTION

Briefly stated, in accordance with one aspect of the invention the foregoing objects are achieved by providing transducer means coupled to the engine for producing a signal representative of the instantaneous combustion efficiency of the engine. A differentiating stage recognizes the sense of changes in engine efficiency and operates a charge controller which is responsive to the manifested sense of efficiency change to progressively vary the fuel/air ratio until the manifestation of combustion efficiency ceases to change.

In a preferred embodiment liquid fuel is metered to a vaporizing stage wherein engine heat is used to vaporize the fuel before it is ingested by the engine. Further, a small amount of exhaust gas from the engine is entrained into the fuel stream before vaporization, and a controlled, variable restriction is disposed intermediate the vaporizer and the engine.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
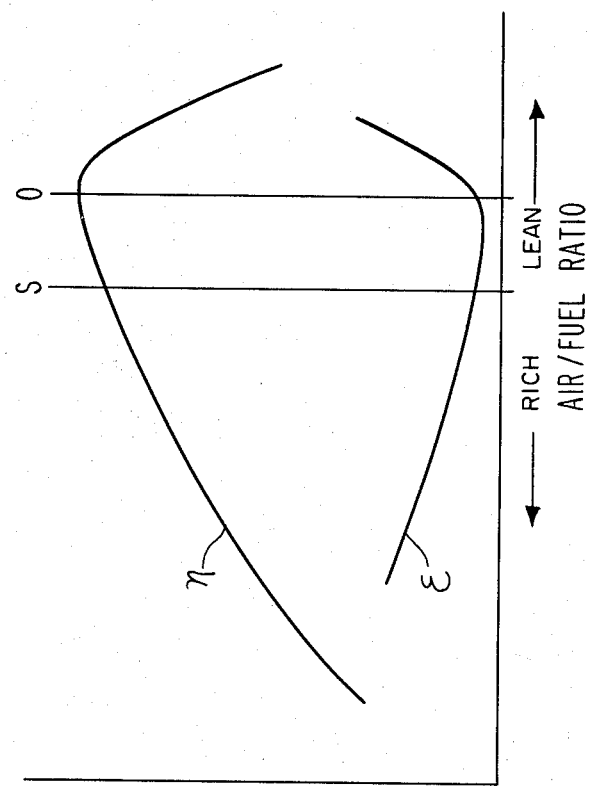
FIG. 1 is a graph illustrating the relationship of combustion efficiency and hydrocarbon emissions to air/fuel ratio.

The curve $\eta$ of FIG. 1 illustrates the relationship between combustion efficiency and the air/fuel ratio of charge ingested by an internal combustion engine. Curve $\epsilon$ of the Figure represents the relationship between hydrocarbon emissions of an internal combustion engine and the air/fuel ratio of the charge delivered thereto. The vertical line labeled S represents the stoichiometric air/fuel ratio, i.e., the point at which sufficient air is present to support theoretically complete combustion of fuel. The vertical line designated O represents the optimum air/fuel ratio for a particular set of conditions, and which is herein defined as the ratio providing maximum combustion efficiency of the engine at any given time.

While it is recognized that there are various approaches to designating the efficiency of an internal combustion engine, in the most basic sense the point of maximum efficiency may be regarded as the point at which the most work is obtained for the least fuel. Accordingly, the efficiency $\eta$ may be defined as $$\eta = \frac{\text{power outputted}}{\text{fuel energy/time}}$$

In other words, the maximum combustion efficiency may be regarded at the point when the ratio of energy flow out (power output) to potential energy (fuel energy) flow in is greatest. Upon reflection, it should be apparent that the point of maximum instantaneous engine efficiency is not necessarily the point of maximum engine power, but rather the point of maximum power for a given instantaneous fuel flow.

Further from FIG. 1 it will be seen that the rate at which emissions are produced by an engine declines as efficiency increases. At the optimum air/fuel ratio, when efficiency suddenly begins to decline the rate of emission begins to rise dramatically. This is believed due to the fact that the engine cannot tolerate the still leaner air/fuel ratio and begins to misfire, whereupon power decreases and unburned fuel is discharged with engine exhaust.

While the graph suggests a fixed, determinable point for both the stoichiometric and optimum air/fuel ratios in practice this is not the case. Basic physical chemistry will predict the stoichiometric ratio, at which sufficient air is present to completely react with all fuel. However, in the actual operation of an internal combustion engine the true stoichiometric ratio is difficult to attain in the engine. This is due to a number of factors including the uneven fuel distribution to various cylinders of the engine, uneven charge distribution in any given combustion chamber, irregular flame propagation in the combustion chamber, variations in air temperature and humidity, and many other uncontrollable factors. The optimum air/fuel ratio is even more difficult to predict since even more variables are involved. Indeed, the optimum ratio cannot be defined in terms of a fixed air/fuel ratio as can the stoichiometric ratio. This is because the point of maximum combustion efficiency is directly related to the power outputted by the engine. Under some operating conditions, a richer-than-stoichiometric mixture may be required; under other conditions an extremely lean mixture may be tolerated by the engine. Accordingly, the optimum ratio is continually changing during engine operation, "floating" so that it is not susceptible of accurate prediction or calculation.

Due to the ever-changing nature of the optimum ratio it can be seen that it is extremely difficult to attain this point by means of a "programmed" charge control system, no matter how complex. In theory the "programmed" type of system can be provided with a great number of setpoints, the proper setpoint being selected in response to various engine stimuli as suggested above. However, the selection of a setpoint for the control system must always be founded upon certain predictions based upon conditions which are assumed to obtain when certain stimuli or engine parameters occur. Unfortunately, even when a number of engine parameters or stimuli are sensed, before-hand assumptions can still be inaccurate due to the multiplicity of factors affecting engine operation. Finally, even if all of the relevant parameters could be monitored and appropriate setpoints programmed for each, still the assumptions would only hold true for a relatively limited period of time since engine parameters change as the engine components wear and/or age.

In contradistinction to presently-accepted theory, on the other hand, the present invention does not implement a fixed or "programmed" change in the fuel/air ratio in response to sensed engine operating parameters. Rather, the thesis of the present invention is to monitor one or more engine parameters representative of instantaneous combustion efficiency and continuously, progressively increase the air/fuel ratio to the maximum which can be tolerated by the engine, that is, until the engine combustion efficiency ceases to increase in response to the increased air/fuel ratio.

Figure 2:
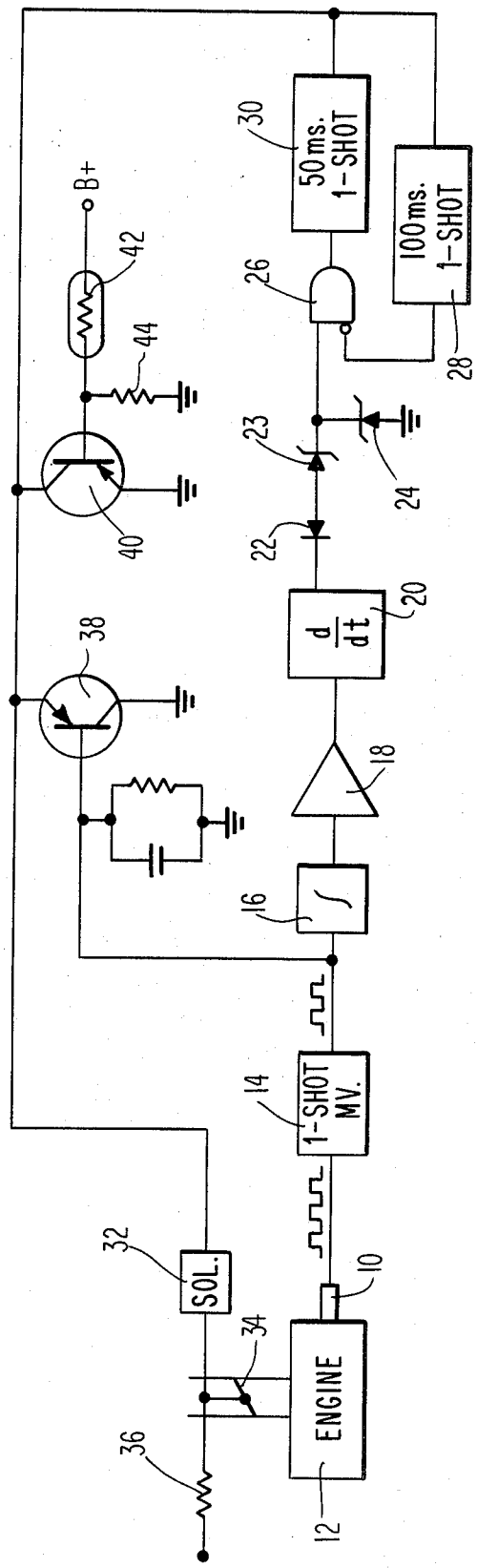
FIG. 2 is a schematic diagram of an analog-type signal processing system.

Turning now to FIG. 2, a signal processing system for carrying out the present invention is illustrated. A transducer 10 is coupled to an internal combustion engine 12 and outputs a manifestation of engine combustion efficiency. At this point it should be noted that while engine 12 will be described in terms of a conventional piston engine, it is contemplated that the invention is fully applicable to various diverse sorts of internal combustion engines including but not limited to free-piston engines, turbines, and so-called "Wankel" or rotary engines. Accordingly, terms such as "combustion chamber", "piston", "manifold", should be regarded as being used in the generic sense regardless of the specific form which they may take in a given application.

The engine parameter which is monitored by transducer 10 advantageously is one which is directly related to engine output power. In theory, a transducer which directly outputs a representation of engine power will work admirably with the present system. So, too, a strain gauge indicating engine torque would work admirably. Also, a plurality of transducers such as utilized in the system disclosed in copending U.S. patent application Ser. No. 715,836, filed Aug. 19, 1976 and invented by E. Leshner may be used to produce an indication of engine power. However, for most applications it has been found that engine speed can be considered to be a reliable indication of relative engine power output. The information required by the present signal processing system is only the sense of short-term changes in engine efficiency, or (for a fixed fuel flow) in instantaneous engine power. Inasmuch as for most practical applications engine load does not change precipitously, the present inventor has determined that short-term changes in engine RPM can usually be attributed to changes in engine power and in fact in a successfully-tested embodiment engine RPM was successfully used.

Once the present invention is understood it will be apparent to persons skilled in the art that various parameters can be selected from which to infer the instantaneous combustion efficiency of the engine, and appropriate signals derived for operating the system. Thus a signal representing instantaneous combustion efficiency is one which reflects a continuous, ongoing process which changes with time so that the signals continuously follow or denote variations in combustion efficiency.

In the illustrated system the transduced signal representing engine power (RPM) constituted a series of pulses. Pulses related to engine speed are easily derived from most engines it being apparent, for instance, that electrical impulses in the ignition system are directly related to engine speed. In a successfully-tested embodiment a magnetic transducer disposed in close proximity to the gear teeth on the engine flywheel was used to produce a train of pulses directly representative of engine speed. The pulses thus produced varied both in frequency and duration due to the nature of their generation. In accordance with good signal processing practices a one-shot multivibrator 14 is triggered by the pulses and outputs a train of pulses of fixed width, but whose frequency corresponds to the signals outputted by transducer 10. The frequency-modulated signal is then detected and integrated by conventional integrator stage 16 which outputs a DC signal whose value is representative of engine speed. An operational amplifier 18 is then used to both amplify the signal and to buffer the integrator 16 from succeeding stages.

The signal system thus far described corresponds closely to conventional tachometer circuitry, and in fact it is possible for a DC voltmeter to be coupled to amplifier 18 for producing an indication of engine speed. However, in the present system the DC signal is applied to a conventional differentiating circuit 20. As is familiar to those skilled in the art the differentiating stage, by definition, outputs a signal indicative of the rate of change of the inputted, engine speed signal. For reasons which will be subsequently apparent, a diode 22 or the like is provided so that only differentiated outputs indicative of engine power change in a fixed direction or sense are communicated to subsequent circuitry. A threshold or breakover element, here illustrated as a Zener diode 23, passes only signals having a predetermined value. A clipper such as Zener diode 24 is also provided. In substance, the signal provided by the combined differentiator 20 and diodes 22, 24 is a single-polarity signal having a fixed value. In a preferred embodiment the differentiated signal is passed to subsequent circuitry only when engine power is decreasing. Accordingly, when instantaneous power (RPM) is steady, or increasing, no signal is produced. As engine power (speed) declines, however, a fixed, level DC signal arises. This signal is applied both to an AND gate 26, and to another terminal of the AND gate by way of a 100 millisecond one-shot oscillator 28. The output of AND gate 26 triggers a 50 millisecond one-shot multivibrator 30, whose output in turn energizes a solenoid 32. The solenoid comprises the motivating means of the servo system of the present invention, and operates air throttle 34 of engine 12 which is biased by means of a spring 36.

In practice, it has been found desirable to initiate a "threshold" effect for the illustrated system. Accordingly, a first transistor 38 is coupled between solenoid 32 and ground for disabling the solenoid under low-speed conditions. This allows the mixture of the engine under idle conditions to be set by a separate, idle system inasmuch as it is not anticipated that optimization of engine charge is necessary at idle.

Operation of the system of FIG. 2 will now be discussed in detail, making reference to the previously-enumerated elements. To start the engine throttle 34 is temporarily closed, for instance by a manual control which overcomes the force of spring 36. When engine 12 is operating above some threshold, idle speed a signal representative of engine speed is produced as described by transducer 10, multivibrator 14 and integrator 16. Under any given set of conditions, spring 36 will urge air throttle 34 toward its fully opened position. In this manner, left to itself the throttle system would lean the air/fuel mixture to a point where the engine could not operate. Thus, at any given instant the air/fuel mixture will be urged to a progressively leaner ratio. Assuming that the fuel metering system is such as to supply the engine with enough fuel to provide a richer-than-stoichiometric charge, as throttle 34 is urged toward its opening position, the increasingly lean charge will cause the engine to run more efficiently and accordingly output more power. Assuming that engine load has not changed significantly, the increase in developed power causes engine speed to increase correspondingly and the level of the DC signal outputted by amplifier 18 increases accordingly. The differentiated signal reflecting the increase, however, does not traverse diode 22 and accordingly throttle-operating solenoid 32 remains disabled.

With the solenoid inoperative, air throttle 34 continues to be opened, still further increasing the air/fuel ratio of the charge supplied to engine 12. Eventually, the optimum air/fuel mixture is reached and the engine power ceases to increase. Accordingly, and still assuming no significant change in engine load, engine speed ceases to increase and amplifier 18 ceases to output a signal. Solenoid 32, however, remains disabled and air throttle 34 continues to open.

In the next instant of time the progressive opening of air throttle 34 effects a leaner-than-optimum air/fuel ratio and, consistent with the graph of FIG. 1, engine output power begins to decline. A negative-going DC signal is then applied to differentiator 20, which responds by producing a negative output voltage whose magnitude reflects the rate of decline. As the rate of decline (above some threshold value) is irrelevant to operation of the present system, clipper diode 24 may be used to prevent an overly-large voltage from injuring subsequent circuitry. The negative-going signal is applied immediately to one terminal of AND gate 26. AND gate 26 then enables one-shot circuit 30 which outputs a pulse having a duration of 50 ms. for energizing solenoid 32. When the solenoid is energized it counteracts the effect of spring 36 and pulls throttle 34 back toward a closed position. Due to the operation of one-shot 30, however, the solenoid is only energized for a brief period. The response time of the overall system is adequately fast so that, if the brief countervailing pressure upon throttle 34 succeeds in enriching the mixture to the optimum point, engine speed will stop decreasing and differentiator 20 will no longer produce a signal for enabling the solenoid. However, if the brief, countervailing pressure upon air throttle 34 does not halt the decline in engine speed, the differentiator will continue to output a negative-going signal. Accordingly, 100 ms. after its initial energization, one-shot 28 produces another pulse of 100 ms. duration. It will be understood that this occurs 50 ms. after the termination of the signal from one-shot 30 so that, in the presence of a continually decreasing engine speed a train of 50 ms. pulses, arising at 100 ms. intervals, are applied to the solenoid for continuously and progressively closing air throttle 34 against the countervailing pressure of spring 36.

It has been found advantageous to disable the present optimizing system under conditions wherein the engine 10 is decelerating or coasting, such as when a vehicle powered by the engine is coasting down a long incline. To this end a transistor 40 is coupled in shunt across the line coupling signal solenoid 32. The base of the transistor is coupled across a source of appropriate potential B+ by way of a pair of resistors 42, 44. Resistor 42 is a temperature-sensitive resistor placed in operative relationship with the exhaust stream from the engine. Accordingly, while the engine is operating under normal circumstances the exhaust stream is sufficiently warm to decrease the resistance of element 42, back-biasing transistor 40. However, when the engine is coasting the immediate decrease in exhaust gas temperature raises the resistance of element 42 so that transistor 40 becomes conductive to disable solenoid 32.

The operation of the system of FIG. 2 will now be described in detail, making particular reference to the elements thus far described. When engine 12 is first started and under idling conditions, transistor 38 serves to disable the optimizing system so that the engine is operated by a non-optimum charge forming device which may, for instance, be a conventional carburetor or fuel injection stage. As stated above, the force of spring 36 may be overcome or other means used to temporarily close throttle 34. As engine speed increases the signal level (rate of pulses) increases to back-bias transistor 38. As more fuel or fuel/air mixture is fed to the engine, for instance by conventional charge forming apparatus, the increase in engine speed which occurs results in a positive-going signal from differentiator 20 which is blocked by diode 22. When the optimizing system is enabled a progressively leaner charge is effected due to the bias of throttle 34 by spring 36. As soon as the optimum (lean limit) point is reached the efficiency and accordingly the power of the engine begins to decline. This change in the sense of the rate of change of power causes differentiator 20 to output a negative signal which initiates a stream of 50 ms. pulses which energize solenoid 32. As indicated above, the breakover value of Zener diode 23 is selected such that only signals representing an inordinately rapid rate of change of engine speed are passed to trigger the enabling circuitry. Zener 23, or any equivalent threshold device, is advantageously selected such that changes of engine speed which are encountered in normal engine operation are insufficiently rapid to trigger the circuitry.

In one successfully-tested embodiment the system was adjusted to respond to changes in engine speed of greater than 2000 RPM per second. Accordingly, during normal periods of acceleration an abrupt, though small, decrease in engine speed owing to the throttle-opening action of spring 36 will cause solenoid 32 to be enabled whereupon the throttle will be progressively closed until the decrease in engine speed stops. This action takes place so rapidly that it is practically imperceptible to an individual operating the engine. The effects of the system may be recognized with proper instrumentation as imposing small perturbations upon larger, slower engine speed changes.

Similarly, at substantially constant engine speed spring 36 will continue to urge throttle 34 open, increasing the air/fuel mixture of the charge. Should the air/fuel ratio of the charge be less than optimum at any given instant, the opening of the throttle will effect a commensurate increase in engine speed. As long as engine power, and thus engine speed, increases with increased throttle opening solenoid 32 remains inactive. As soon as the optimum point is attained, however, further opening of throttle plate 34 effects a rapid decrease in engine speed. This decrease gives rise to a negative signal by differentiator stage 20. The response of the engine to the progressively opening throttle is sufficiently rapid so that the differentiated signal is high enough to traverse threshold device 23 and activate one-shot circuit 30. The pulse outputted by circuit 30 then energizes solenoid 32 which opposes the action of spring 36. If the initial, 50 ms. counter-pressure is not sufficient to stem the decrease in engine speed, the continued presence of an output signal from differentiator 20 will maintain a train of 50 millisecond pulses for continually energizing solenoid 32 and progressively closing throttle 34. As soon as the decrease in engine power ceases, the power-related signals cease to decline and the output from differentiator 20 has terminated. With solenoid 32 disabled, spring 36 now urges throttle 34 to open once more, renewing the increase in the air/fuel ratio which had previously occurred.

Under steady state conditions throttle 34 will be constrained to a position whereby the optimum air/fuel ratio or lean limit is obtained. In the illustrated embodiment this is effected by the intermittent actuation of solenoid 32 as engine power alternately increases and decreases. The changes in engine power, and thus engine speed, are however so small as to be unnoticed and the operation of the system is substantially continuous.

While the system of FIG. 2 has been particularly disclosed as using an incrementally-energized solenoid it will be readily apparent to those skilled in the art that the energization of the system could as easily be accomplished by a continuous signal so that throttle 34 does not undergo even small perturbations. In fact, however, the rapid response of the present system, coupled with the inertia of the moving parts, results in a substantially continuous, smoothly-operating apparatus.

Figure 3:
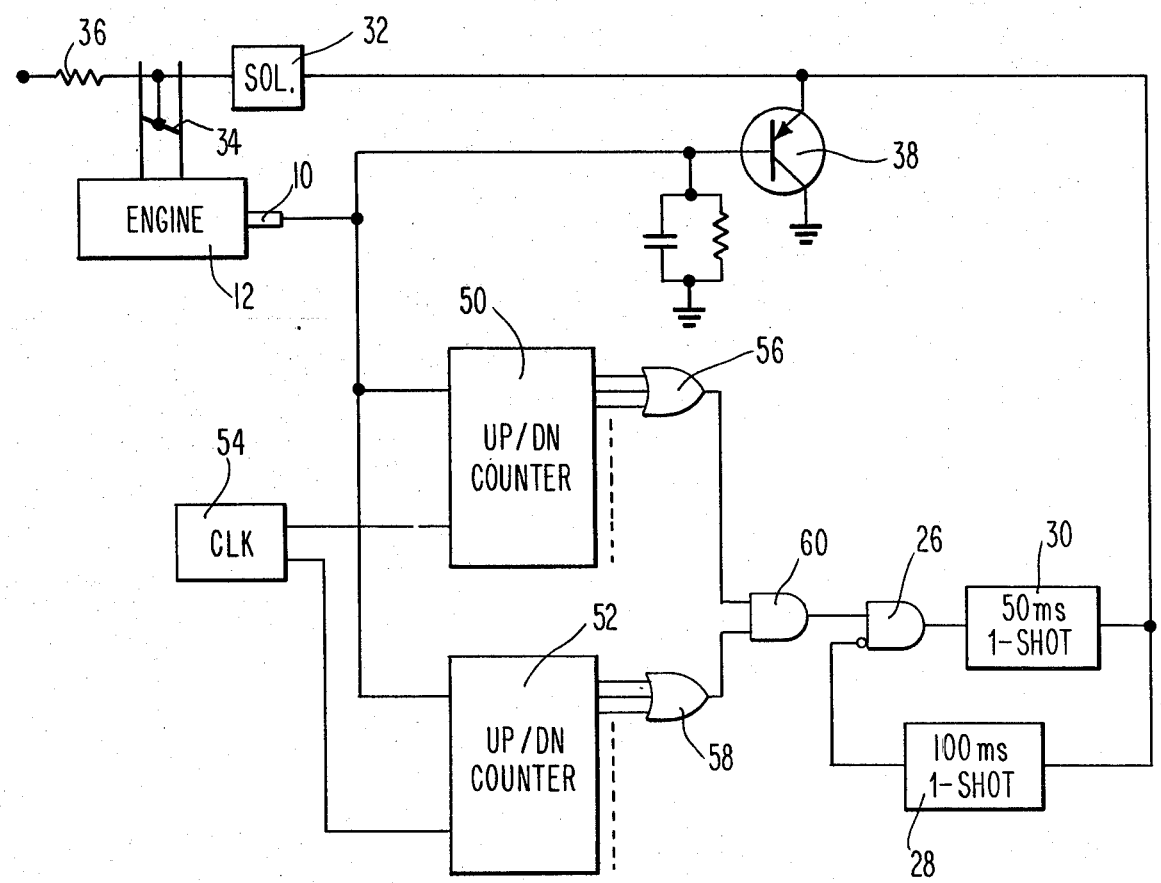
FIG. 3 is a schematic diagram of a digital type of signal processing system.

FIG. 3 illustrates another embodiment of the present system in which the signal processing circuitry is essentially digital in form. In essence, the digital circuitry serves to count numbers of speed-related pulses during succeeding intervals, then compare the numbers of pulses counted to detect changes in engine speed above some predetermined threshold value. As with FIG. 2, a transducer 10 is coupled to engine 12 for outputting a train of pulses reflecting engine speed. As set forth hereinabove, in view of the extremely rapid response time of the subject system engine 12 may be considered to be operating under a constant load, so that changes in engine speed may be equated to changes in power output. Further it may be assumed that fuel flow is substantially constant from one sampling period to the next so that changes in engine power may be taken to reflect changes in combustion efficiency of the engine.

Pulses from transducer 10 are applied to first and second up/down counters 50 and 52. A clock 54 shifts the operation of counters 50, 52 operating them sequentially so that for a first clock period counter 50 counts or accumulates a given number of pulses from transducer 10, depending upon engine speed. During the next, equal interval the mode of operation of counter 50 is reversed and it counts down or discharges pulses previously received at a rate determined by signals inputted from transducer 10. If engine speed remains substantially identical the counter will always return to its initial count, e.g., zero. In the present embodiment the system is adapted to be energized by an increase in engine efficiency, in contrast to the system of FIG. 2. Accordingly, the initial, higher-numbered bit positions of counter 53 are brought out and coupled to OR gate 56. The capacity of counter 50 is substantially larger than can be filled by the engine at its highest speed, so when engine speed increases the counter cycles back through zero and around to its highest-numbered stages, corresponding to a "negative" count. The responsive speed of the system is such that changes in engine speed only result in enablement of a few stages, herein depicted as the first three stages of counter 50.

Realizing that a fixed "threshold", such as represented by discrete counts, may be approached in one case and exceeded in another by small changes in speed a second counter 52 is provided. Counter 52 is substantially identical to counter 50, several of its higher-numbered bit positions being brought out to an OR gate 58. In the event that a specious count is received by counter 50, for instance indicating a substantial increase in engine speed when in fact the change has been insignificant it is statistically improbable that such an insignificant change will arise in the next following sampling sequence. Accordingly, the outputs of OR gates 56 and 58 are compared in AND gate 60. A coincidence in status of counters 50 and 52 is assumed to be a verification of an increase in engine speed. For present purposes it is not believed critical whether the counters have counted down to the identical number, although in a vast majority of instances this will be true. Rather, the fact that each counter has counted down to approximately the same state denotes that engine speed has increased over two consecutive sampling periods. By making the sampling periods extremely short substantial duplication of results can be attained.

Once an increase in engine speed has been verified the signal which then arises is applied to AND gate 26, energizing the 50 ms. one-shot multivibrator 30 as described hereinabove. Persistance of the signal denoting engine speed increase then results in a train of 50 ms. pulses which are applied to solenoid 32 for continually and progressively urging throttle 34 to the open position, whereby the air/fuel mixture is made leaner until the lean limit is reached.

It will now be appreciated that FIGS. 2 and 3 simply comprise different executions of the same technique. In both cases rapid fluctuations in engine speed are sensed, and the direction of change is determined and used to effect either an increasing air/fuel ratio, in the presence of increasing engine speed, or decreasing the ratio in the presence of a decreasing speed. Further, the rapidity of the system response is such as to render changes in load and changes in fuel flow to the engine substantially insignificant. That is, for most applications changes in load or fuel flow are so slow as to be insignificant with respect to the response speed of the present system. It is for this reason that a manifestation of engine speed can be treated as denoting relative engine power. Further, inasmuch as changes in fuel flow occur very slowly in comparison to the operation of the illustrated system, it can be assumed that changes in engine speed which are detected by the system are directly attributable to the operation of throttle 34, and not to an increase in fuel flow.

Figure 4:
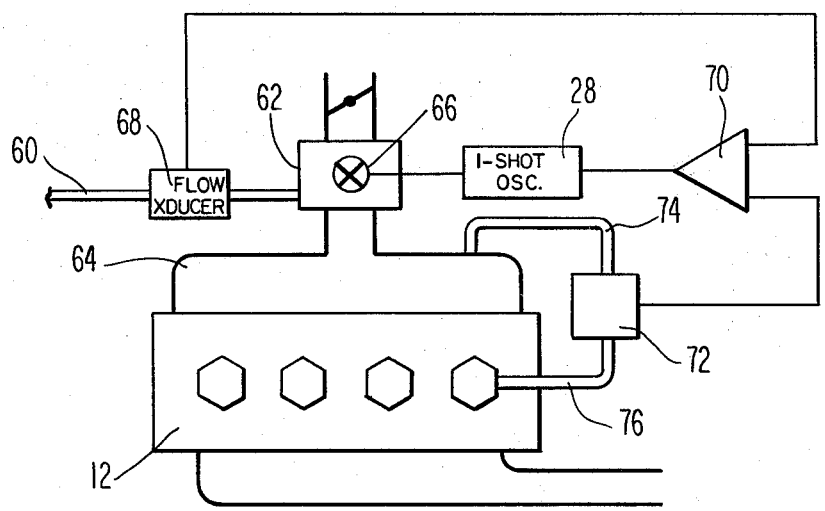
FIG. 4 is a schematic diagram of an embodiment of the present invention using a particular transducer arrangement.

Turning now to FIG. 4 there is shown another embodiment of the present invention, wherein the fuel/air ratio is optimized by servoing fuel flow rather than air flow. The fuel is brought through a conduit 60 to a charge forming device 62 coupled to the inlet manifold 64 of engine 12. A valve 66 is shown in idealized form in connection with charge forming stage 62, and operated by a servo which may be solenoid 32. Valve 66 advantageously comprises a conventional adjustable metering jet or the like, for varying the fuel/air ratio of the charge being supplied to the engine. A conventional flow transducer 68 is coupled in operative relationship with conduit 60 and develops a signal representative of the flow rate of the fuel which is supplied to a comparator 70. An indication of engine power is applied to the other input of comparator 70 after having been smoothed and integrated by applicant's integrating means. In the embodiment illustrated in FIG. 4 a measure of engine power is derived from a transducer of the type disclosed in U.S. patent application Ser. No. 715,836, filed Aug. 19, 1976 By E. Leshner and assigned to the assignee of the present invention. The transducer system in one embodiment comprises a simple chamber 72 having therein a deflectable partition carrying a strain gauge or the like. One side of the so-divided chamber is brought into communication with inlet manifold 64 by a small tube or the like 74, while the other side is coupled to the combustion chamber of engine 12 by another conduit 76.

As clearly set forth in copending application Ser. No. 715,836, the output of the transducer system is an electrical signal which is directly representative of actual developed engine power. Further, and as discussed above, for present purposes instantaneous engine power can be related directly to instantaneous combustion efficiency.

The signals representing the rate of fuel flow and instantaneous power are applied to the comparator 70. The comparator, which may be an operational amplifier biased to be driven into saturation by the applied signals, outputs a step function of a predetermined magnitude for operating control stage 78. The control stage advantageously comprises the one-shot multivibrator arrangement shown in FIGS. 2 and 3; or may simply be a buffer or amplifier stage for driving the fuel-metering servo.

In operation, and similar to the embodiments of FIGS. 2 and 3, an increase in engine power is responded to by a decrease in fuel/air ratio. In the present system this is accomplished by progressively closing valve 66. The closure of the valve then continues as long as instantaneous power increases, until the lean limit is reached and power begins to diminish. At this juncture the solenoid-enabling signal ceases and valve 66 begins to open. In this manner a control system operates to reverse the change in fuel/air ratio whenever the lean limit point is traversed. The feedback system then progressively and continuously seeks the fuel/air ratio which defines the lean limit of engine operation at any given instant.

Figure 5:
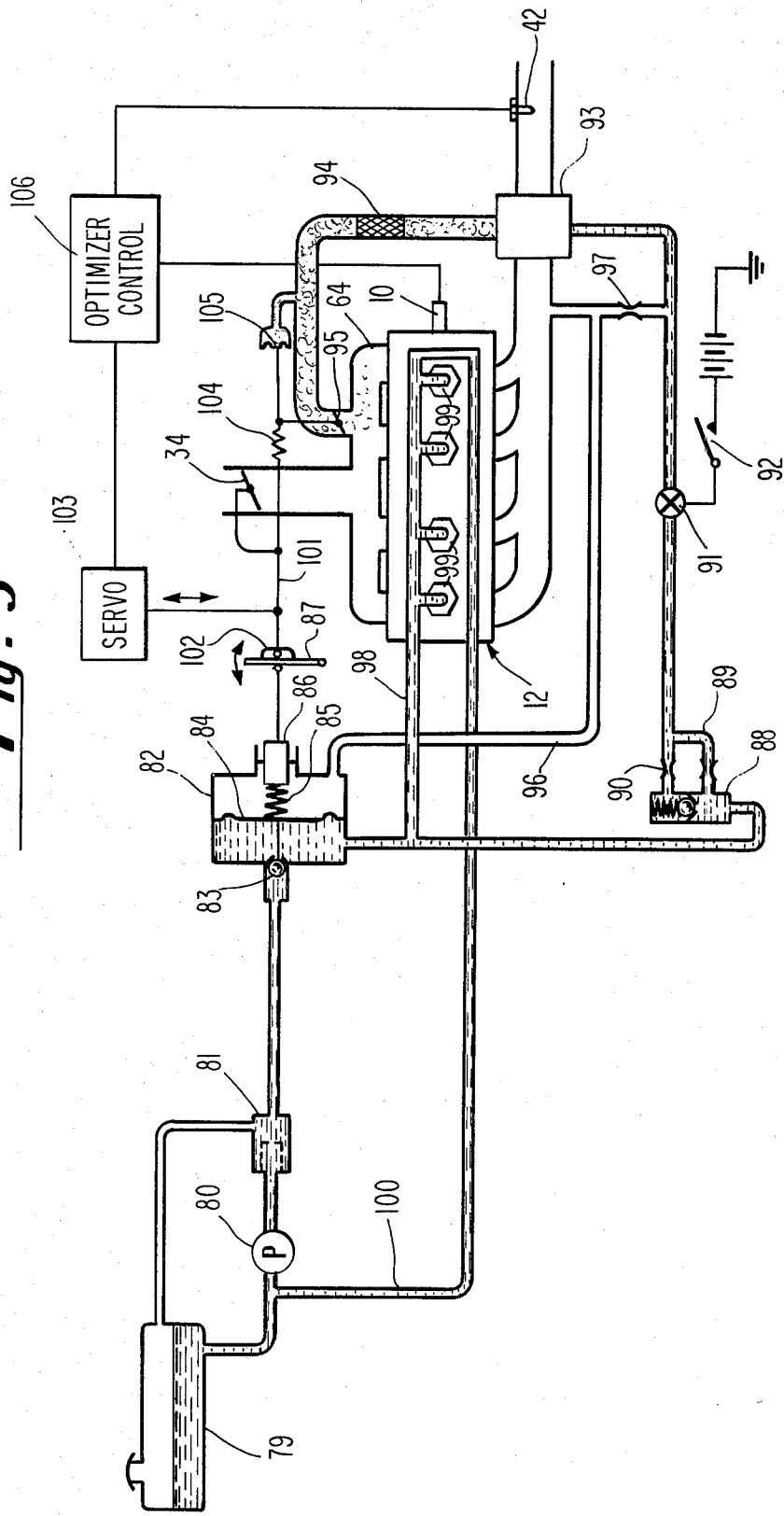
FIG. 5 is a detailed diagram of the overall charge forming system for an internal combustion engine.

FIG. 5 shows in detailed form a successfully-tested embodiment of the present invention, including a fuel delivery and vaporizing system operating in conjunction with the above-described optimizing control. Fuel from tank 79 is urged by means of a pump 80 through a combination filter and vapor separation stage 81. The fuel then continues to a regulator 82 comprising check valve 83 coupled to a diaphragm 84. At the other side of the diaphragm a spring 85 is urged thereagainst by a plunger or the like 86, in turn coupled to a manually operable lever 87, which may for instance be the accelerator pedal of a vehicle. Fuel from the regulator is passed to a relief valve 88 which outputs fuel through low and high speed restrictions 89, 90 respectively. A solenoid valve 91 is coupled through a switch 92, which may for instance be the ignition switch of the vehicle, to a source of potential whereby fuel may be passed by the system only when the overall system is energized.

The fuel, still in liquid form, then traverses a vaporizer stage 93. The latter constitutes a fuel-enclosing envelope brought into thermal contact with gases from engine 12 in the manner of the vaporizing system described in more detail in U.S. Pat. No. 4,015,569 and invented by the inventor of the present system. Vaporized fuel exits from the vaporizer and, in a preferred embodiment, traverses a catalyst 94 which may be of nickel, copper or other appropriate material for dissociating the vaporized fuel. A vapor throttle 95 controls the pressure drop between the reservoir of vaporized fuel and the inlet manifold 64 of the engine.

Exhaust gas pressure is fed back to the rightward side of diaphragm 84 by means of an appropriate conduit 96, and through a passage having a restriction 97 directly into the liquid fuel stream flowing to vaporizer 93. Finally, liquid fuel is passed through a distribution conduit 98 to combined igniter/injector plugs 99, advantageously of the type disclosed in U.S. Pat. No. 3,926,169. Excess fuel from the igniter is returned to the main fuel supply through an outlet conduit 100.

An air throttle 34 of a conventional type is linked to pedal 87 by a linkage which includes a displaceable link 101, coupled to pedal 87 by a mating link 102 so that the mechanical advantage of the pedal upon the air throttle may be varied. The mechanical advantage is controlled by a servo 103 which may, for instance, be a solenoid of the type illustrated at FIGS. 2 through 4. The linkage from pedal 84 is further coupled to vapor throttle 95, and by way of a spring 104 to a disphragm 105 in pressure communication with the vaporizer fuel. Servo 103 is operated by an optimizer control 106 which may advantageously be of the "analog" type disclosed in FIG. 2. A transducer 10 derives signals representative of engine speed, and accordingly efficiency, while transducer 42 is used to provide an electrical quantity which varies in accordance with exhaust gas temperature.

At low speeds fuel is metered through ball valve 83 to check valve 88, at a pressure established by the position of pedal 87, which controls the pressure imposed by spring 85 against diaphragm 84. At low pressure, and thus low rates of flow, liquid fuel passes through restriction 89 and now-open solenoid valve 91 and approaches vaporizer 93. Exhaust gas is entrained into the liquid fuel through restriction 97. The exhaust gas serves as a carrier for facilitating the passage of liquid and vaporizing fuel through the fuel vaporication and delivery system.

Restriction 97 is of relatively small size, so that only a small amount of exhaust is actually admixed with the liquid fuel. As will be recognized by those skilled in the art for any given engine the exhaust pressure (back pressure) varies as a function of engine speed, and also by the volumetric efficiency of the engine. The pressure added to the flowing fuel by the exhaust gases thus aids in maintaining a smooth continuous rate of flow over a broad range of engine operation and assists in urging vaporized fuel into the engine under conditions of low intake manifold vacuum. Thus, the more air pumped through engine 12, and accordingly the more power developed thereby, the more supplementary pressure is added to the flow of fuel. Still further, exhaust gas pressure is used as a compensatory mechanism, and is fed back to the rightward side of the diaphragm 84 to aid the pressure adduced by pedal 87. Accordingly, for higher rates of air flow through the engine additional fuel pressure is developed which in effect counteracts the pressure introduced into the fuel flow line through restriction 97. In this manner the pressure differential introduced by the exhaust gas being fed into the fuel line is substantially balanced.

Heat from the exhaust gases of engine 12 serves to vaporize the liquid fuel in vaporizer 93 so that a pure fuel vapor issues therefrom. The introduction of small amounts of exhaust gases does not detrimentally affect the composition of the vapor; to the contrary, it appears that the small amount of residual oxygen in the exhaust gases enhances the dissociation of hydrocarbon fuel components so that the combustibility of the vaporized fuel is enhanced. For instance, it is believed that gaseous hydrogen and other, light hydrocarbon products evolve from the dissociation of the liquid fuel in the vaporizer. Thus it will be seen that the exhaust gases, in addition to aiding in carrying fuel flow, also aid in increasing the combustibility of the fuel. In a preferred embodiment a catalyst 94 is provided in the vapor fuel conduit in order to promote still further dissociation of the fuel constituents. The catalyst may be solid; a mesh or porous element disposed within the conduit; or may comprise a portion of the conduit itself.

A diaphragm 105 is operatively coupled to the interior of the fuel vapor conduit. The position of the diaphragm, and thus the tension exerted upon spring 104, is representative of the relative pressure of the vaporized fuel. Accordingly, the position of vapor throttle 95 is varied both as a function of pedal position, and relative vapor pressure.

As pedal 87 is depressed air throttle 34 is opened, along with vaporizer fuel throttle 95. The additional pressure exerted upon diaphragm 84 increases fuel pressure, and accordingly fuel flow. The fuel pressure unloads check valve 88 and urges still more fuel through vaporizer 93. The additional pressure within the vaporized fuel conduit urges diaphragm 105 outwardly, allowing fuel vapor valve 95 to open further. A rapid depression of pedal 87, requiring acceleration of the engine, opens air throttle 34 still further and additionally forces more fuel through vaporizer 93.

In the absence of fuel vapor throttle 95, or similar variable restriction, a sudden lag in engine response has been experienced, similar to the reaction of a conventionally-carbureted internal combustion engine when the accelerator pump is disabled. In order to overcome this undesirable characteristic, the vapor fuel throttle 95 is also opened by depression of the pedal 87. This tends to diminish the restriction, and thus the relative pressure drop, between the interior of the vapor fuel conduit and inlet manifold 64. The biasing action of diaphragm 105 upon spring 104 varies the response of throttle 95 such that the latter is more responsive to pedal position when the vaporized fuel within the delivery conduit is at a relatively high pressure. This further encourages the flow of vaporized fuel into manifold 64 so as to make more fuel available to the engine under accelerative, or low manifold vacuum, conditions.

The optimizer control illustrated in FIG. 5 acts in the same manner as those of the previous Figures to continuously and progressively cause the fuel/air mixture to approach the lean limit. In particular, engine speed as evinced by a signal from transducer 10 is fed to the optimizer control 106, which operates servo 103 to raise or lower linkage 101. With linkage 101 in its lowest position with respect to pedal 87 a relatively large mechanical advantage is produced between the pedal and throttles 34 and 95, although with a commensurate loss in throttle movement for a given pedal throw. As the linkage is raised more and more throttle opening occurs for a given degree of pedal deflection. It will now be understood that the linkage is apportioned such that at all times more air throttle opening is available than necessary, i.e., the system is always capable of diminishing the fuel/air ratio to a point beyond the lean limit under any circumstances.

As described hereinabove, the optimizing control response to rapid changes in engine power causes servo 103 to open or close air throttle 34. In response to an increase in engine efficiency, as evinced by output power, link 101 is raised so that throttle 34 is opened to effect a leaner air/fuel mixture. This activity continues as long as engine power increases so that the system is "open ended" and progressively leans out the engine mixture until it passes the lean limit and instantaneous engine efficiency, as manifested by engine power, begins to fall.

As soon as the engine power diminishes, the optimizer control and servo system effects a reversal in the direction of movement of throttle 34, enriching the fuel/air mixture and effecting a cessation in the decline of engine power. Accordingly, the change effected in fuel/air ratio is caused to reverse whenever the lean limit point is traversed from either direction. The control system comprises a closed-loop feedback which, unlike prior art systems, does not seek to implement a programmed or predetermined fuel mixture; rather, it continuously and progressively changes the fuel/air mixture until a change in the sensed engine characteristic ceases or reverses.

A probe 42, which may be a thermistor, is placed in operative association with gases flowing from the exhaust manifold of engine 12. Under normal operating conditions the heat applied to transducer 42 allowed optimizer control 106 to stay in operation. Under certain conditions, for instance when a vehicle is descending a grade with the throttle closed, optimization is not required. The sudden drop in exhaust gas temperature causes the electrical characteristic of transducer 42 to change, temporarily disabling the optimizer control as set forth with respect to FIG. 2.

In a preferred embodiment liquid fuel is fed through a conduit 98 to injector/igniter plugs 99 which serve to inject fuel vapor into the cylinders of engine 12. While the instant system may be used without such injectors, their presence greatly enhances operation of the system. This is so due to the fact that injectors of the type considered provide an enriched fuel vapor zone about the point of ignition, producing a torch or stratified charge effect which enhances and encourages full combustion of the leaner-than-stoichiometric charge in the balance of each combustion chamber. This allows satisfactory engine operation on even very lean mixtures, which may not be readily ignited by conventional ignition means.

Accordingly, it will be seen that by means of the invention herein disclosed a system is formed which continuously and progressively seeks the leanest possible air/fuel mixture for optimum engine performance at each instant. The system determines the leanest possible point, without regard to the actual air/fuel ratio, inasmuch as the actual optimum ratio may vary from one instant to another depending on a vast array of external factors, and which will vary further for each individual engine depending upon its state of tune, amount of wear, etc. It will further be understood that the inventive system may be implemented in many forms, and certain aspects of the invention are not limited to the particular details of the examples illustrated. It is therefore contemplated that other modifications or applications will occur to those skilled in the art. It may, for instance, be found practicable and expedient to convert existing automobile engines with a minimum of additional mechanism by adding an auxiliary air inlet having a throttle or other restriction controlled by an optimizer control such as that disclosed herein. In this manner a conventional automobile carburetion arrangement may be kept in place, the optimizing system serving to bleed additional air into the inlet manifold in order to optimize the fuel/air ratio of the system at any given instant. It is accordingly intended that the appended claims shall cover all such modifications and applications as do not depart from the true spirit and scope of the invention.

What is claimed as new and desired to be secured by Letters Patent of the United States is:

1. A charge forming system for automatically and continually optimizing the fuel/air ratio of charge supplied to an internal combustion engine comprising:
   transducer means adapted to be coupled to the engine for outputting a first signal representing the instantaneous combustion efficiency of the engine, said transducer means including means for producing signals representing the rate of fuel flow and the engine power output;
   means for combining said signals to produce an output signal representing instantaneous combustion efficiency of the engine; and
   a charge control for changing the fuel/air ratio of the charge, including a servomechanism coupled to said transducer means and responsive to changes in the level of said first signal to decrease the fuel/air ratio of the charge when instantaneous combustion efficiency of the engine is increasing, and to increase the fuel/air ratio of the charge when the instantaneous combustion efficiency of the engine is decreasing.

2. A charge forming system according to claim 1, wherein said charge control is operative to increase the rate of fuel flow in response to changes in said first signal representing a decline in combustion efficiency.

3. A charge forming system according to claim 1 wherein said charge control is operative to decrease the rate of fuel flow in response to a change in said first signal denoting a rise in instantaneous combustion efficiency.

4. A charge forming system for automatically and continually optimizing the fuel/air ratio of charge supplied to an internal combustion engine, comprising:

a movable control member adapted to be manually displaced;

pressure regulator means adapted to be coupled between the fuel reservoir and a fuel distribution system, and further coupled to said control member means for controlling delivered fuel pressure in response to the operation of said manually displaceable means;

a fuel delivery conduit extending from said pressure regulator means;

a fuel vaporizing stage coupled to said fuel delivery conduit and adapted to be disposed in heat exchange relation to the engine for vaporizing liquid fuel delivered thereto;

a vapor conduit for delivering vaporized fuel from said vaporizing stage to the engine;

fuel throttle means disposed in said vapor conduit and operatively coupled to said manually displaceable control member;

air throttle means coupled to said manually displaceable control member;

servo means for increasing opening of said air throttle for any given position of said control member;

transducer means for outputting a signal reflecting the combustion efficiency of the engine; and servo control means coupled to said transducer and responsive to said signal for operating said servo means in response to a sensed change in the combustion efficiency of the engine.

5. A charge forming system according to claim 4 wherein said servo control means is responsive to an increase in engine combustion efficiency to operate said servo in a direction for decreasing the fuel/air ratio of charge supplied to the engine.

6. A charge forming apparatus according to claim 4, wherein said servo control means is responsive to a manifested decline in combustion efficiency of said engine to operate said servo for increasing the fuel/air ratio of the engine.

7. A charge forming system according to claim 4, wherein said manual control member is operative to increase fuel pressure and to open both said fuel and air throttle means in concert.

8. A charge forming system according to claim 7 further including means for introducing exhaust gases from the engine into liquid fuel flowing in said fuel delivery conduit to said vaporizer stage for encouraging the passage of fuel through said vaporizer stage.

9. A charge forming system according to claim 7, further including fuel throttle control means comprising:

a fuel vapor throttle valve operatively disposed within said fuel vapor delivery conduit;

spring means for biasing said fuel vapor throttle valve towards an open position;

a housing having a flexible diaphragm mechanically connected to said fuel vapor throttle valve; and conduit means coupling said housing to said fuel vapor delivery conduit whereby the degree to which said fuel vapor throttle valve is opened by a given displacement of said manual control means is decreased as pressure in said vapor conduit diminishes.

10. A charge forming system according to claim 9, further including:

a linkage for variably coupling said manual control member to said fuel vapor throttle such that displacement of said manual control means in a first sense effects an increase in delivered fuel pressure, air throttle opening and fuel vapor throttle opening; and means for varying the rate at which said manual control means operates said fuel vapor throttle as a function of pressure in said fuel vapor delivery conduit.

11. A charge forming system according to claim 10, further including pressure compensation means coupled to said pressure regulator for increasing regulator output pressure in response to an increase in the pressure of fuel in said fuel delivery conduit.

12. A charge forming apparatus according to claim 4, wherein said pressure regulator means comprises a housing having a flexible diaphragm mounted therein and dividing said housing into first and second portions;

valve means coupled to said diaphragm for controlling liquid admitted to said first portion;

an outflow conduit leading from said first portion;

spring-biased control means adapted to be coupled to said manual control member for bearing upon said diaphragm and disposed in said second portion of said housing;

restriction means disposed in said fuel delivery conduit; and feedback conduit means extending from a point on said fuel delivery conduit downstream of said restriction means to said second portion of said housing.

13. A charge forming system according to claim 4, further including a plurality of fuel injection and ignition elements each adapted to be disposed in operative communication with ones of the cylinders of the engine; and means coupling said fuel injection and ignition elements to said liquid fuel delivery conduit.

14. A charge forming system for automatically and continually optimizing the fuel/air ratio of charge supplied to an internal combustion engine comprising:

transducer means adapted to be coupled to the engine for outputting a first signal representing the instantaneous combustion efficiency of the engine, said transducer means comprising means for monitoring cylinder pressure and manifold vacuum of the engine and for deriving a signal representative of the net sum of cylinder pressure and manifold vacuum integrated over at least one engine cycle;

a charge control for changing the fuel/air ratio of the charge, including a servomechanism coupled to said transducer means and responsive to changes in the level of said first signal to decrease the fuel/air ratio of the charge when instantaneous combustion efficiency of the engine is increasing, and to increase the fuel/air ratio of the charge when the instantaneous combustion efficiency of the engine is decreasing.

* * * * *